April 13, 1943. R. S. DRUMMOND 2,316,676
BURRING MACHINE
Original Filed Jan. 10, 1938   3 Sheets-Sheet 1
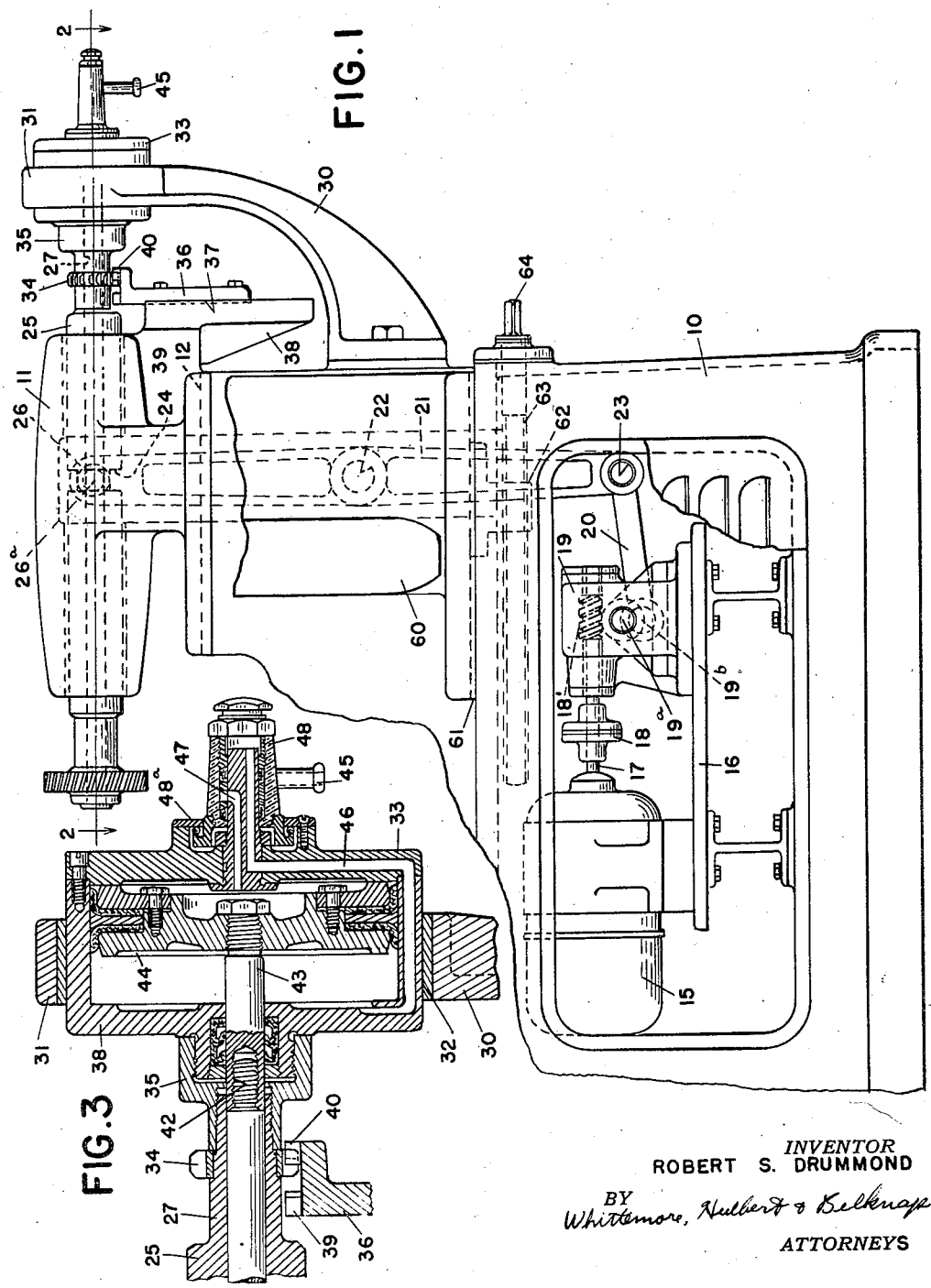
INVENTOR
ROBERT S. DRUMMOND
BY Whittemore, Hulbert & Belknap
ATTORNEYS

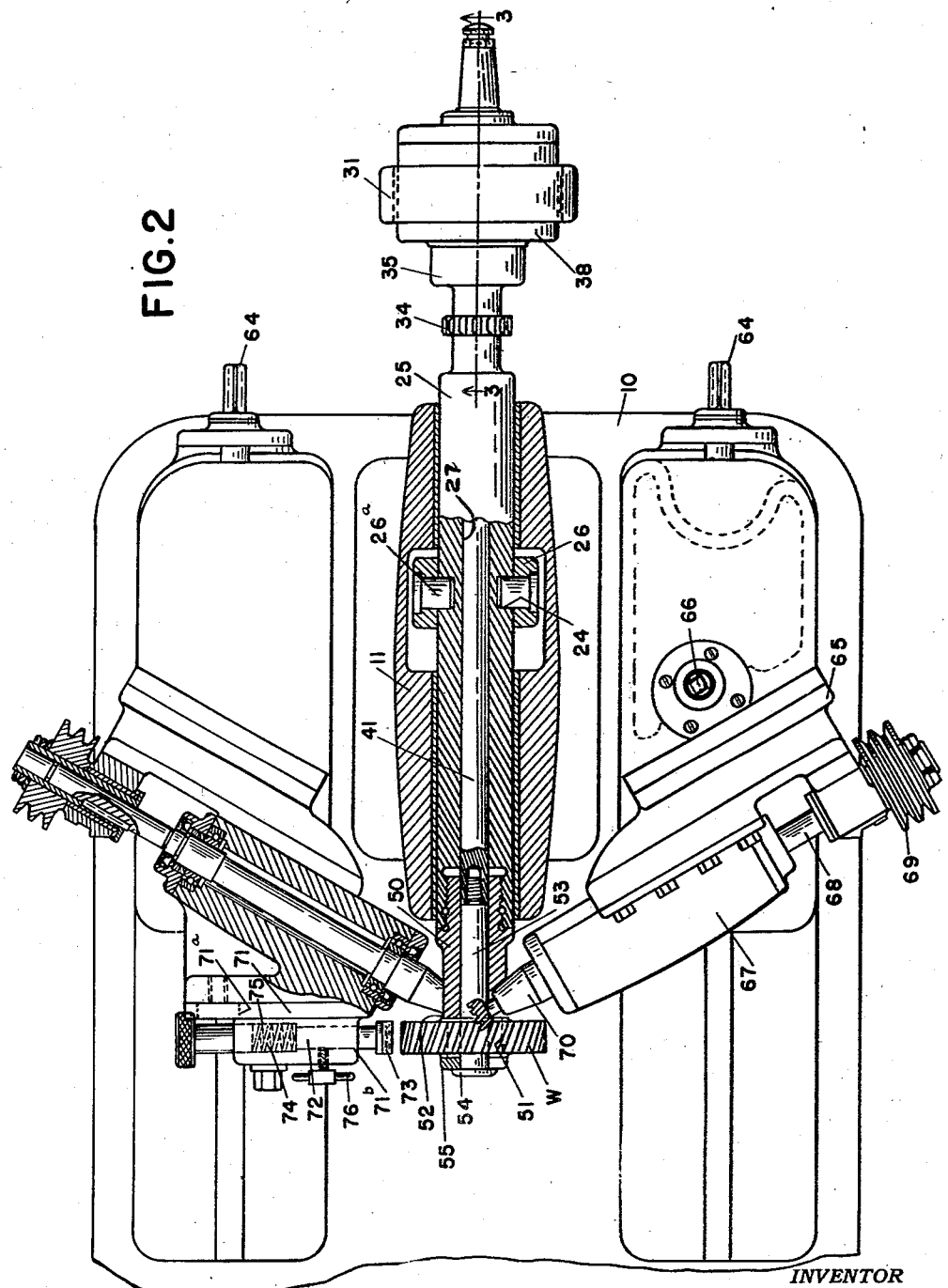

April 13, 1943.  R. S. DRUMMOND  2,316,676
BURRING MACHINE
Original Filed Jan. 10, 1938   3 Sheets-Sheet 3
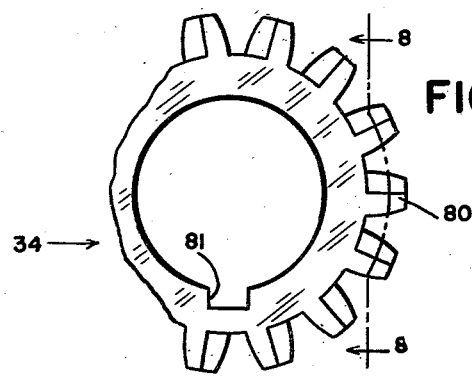
FIG. 7
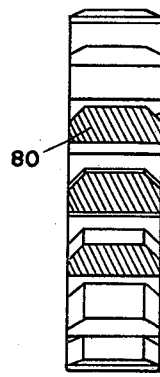
FIG. 8
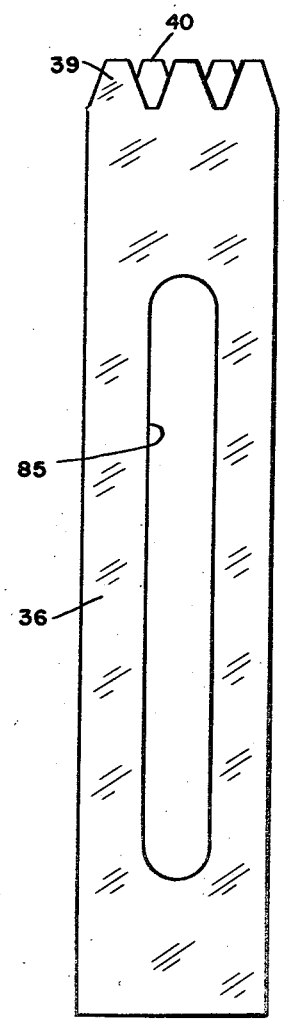
FIG. 4
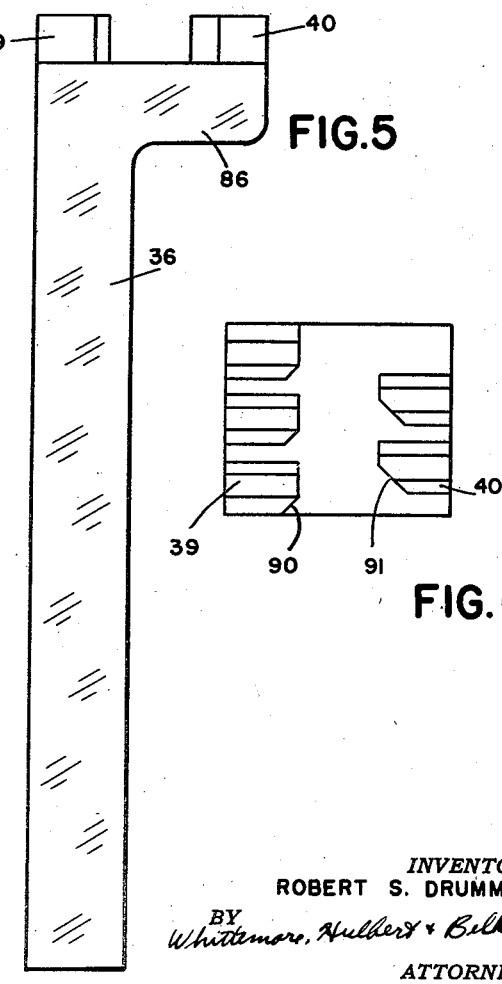
FIG. 5
FIG. 6
INVENTOR
ROBERT S. DRUMMOND
BY Whittemore, Hulbert & Belknap
ATTORNEYS Patented Apr. 13, 1943

2,316,676

UNITED STATES PATENT OFFICE 2,316,676

BURRING MACHINE

Robert S. Drummond, Detroit, Mich., assignor to National Broach & Machine Company, Detroit, Mich., a corporation of Michigan Original application January 10, 1938, Serial No. 184,283. Divided and this application August 14, 1939, Serial No. 290,003

4 Claims. (Cl. 90—1.4)

The present invention relates to a burring machine and more particularly to an automatic machine for removing the sharp edges from the teeth of gears. This application is a division of my co-pending application, Serial No. 184,283, "Burring machine," filed January 10, 1938.

It is an object of the present invention to provide a machine of the type described in which the work spindle is automatically indexed in operation.

It is a further object of the present invention to provide a machine in which the work spindle is axially translated to and from working position and is automatically indexed by such translation.

It is a further object of the present invention to provide a novel indexing mechanism which serves also as a guide and locking means for the work spindle in working position.

Other objects of the invention will be apparent as the description proceeds, and when taken in conjunction with the accompanying drawings wherein:

Figure 1 is an elevation of the machine with parts broken away for clearness;

Figure 2 is a plan view of the machine;

Figure 3 is a vertical section through the air cylinder;

Figure 4 is a front elevation of the index rack bracket;

Figure 5 is a side elevation of the part shown in Figure 4;

Figure 6 is a plan of the part shown in Figure 4;

Figure 7 is a front elevation of the index gear; and

Figure 8 is a side elevation of the index gear sectioned on the line 8—8 of Figure 7.

The machine which forms the subject matter of the present invention comprises essentially a work spindle, upon which is mounted a work piece, in the present instance, a gear. It is desired to perform operations on spaced parts of the work piece, in the example shown, upon the gear teeth.

For this purpose one or more tools, in the present example, two rotary cutters, are provided in adjustable but relatively fixed position on the machine. These cutters may be separately driven or driven from a single source of power, or, if desired, driven from the motor which controls the work.

The work spindle, which may be a stub shaft presenting a free end, or a shaft having a headstock and resilient tailstock, is slidably mounted in a suitable bushing. Motor means reciprocate the shaft axially, to and from a definitely located working or cutting position, so as to permit the tools to take predetermined cuts on the work piece.

Automatic indexing means are provided, so that as said spindle is reciprocated, it is intermittently rotated by predetermined amounts, and is then accurately guided without rotation into engagement with the tool or tools. In the example illustrated, this indexing mechanism takes the form of an index gear reciprocated between two short rack sections, the teeth of the rack being staggered and the teeth of both racks and index gear being beveled.

With the foregoing general description in mind, reference is now made to the figures.

The machine shown as a whole in Figures 1 and 2 comprises a frame 10 upon which is mounted a headstock housing 11, adjustably mounted in ways indicated at 12. A work spindle generally indicated at 25 is reciprocably and rotatably mounted in the housing.

A motor 15 is carried on a platform 16 within the frame of the machine and drives a shaft 17 which connects through a coupling 18 to a worm shown at 18' within a housing 19. The worm drives a gear which connects to crank shaft 19ª. A link 20 is connected to crank arm 19ᵇ, and at its other end is connected by pin 23 to lever 21. Lever 21 is pivoted substantially centrally on pin 22 which is trunnioned in the frame. The upper end of lever 21 presents a yoke 26 and inwardly projecting pins 26ª which engage in an annular groove 24 in spindle 25.

It is evident that motor 15 causes reciprocation of spindle 25, and additionally that spindle 25 is advanced and retracted from a definite working position.

Carriages 60 are keyed to the frame 10, as at 61, for longitudinal adjustment. A depending lug 62 is provided on each carriage, and is in screw threaded engagement for adjustment of the carriages with a threaded rod 63 provided with a turning head 64.

Plates 65 are mounted in vertical ways on carriages 60 and are vertically adjustable by means of lugs and threaded rods, similar to those employed for horizontal adjustment of carriages 60. The turning head 66 of one such threaded rod is shown in Figure 2.

The plates 65 have spindle housings 67 thereon in which are journaled tool spindles 68. These spindles are adapted to be driven from separate motors (not shown) also carried by plates 65, and for this purpose are provided with sheaves 69 for connection to the driving motors. Spindles 68 are provided at their free ends with tool carrying portions 70.

Means for initially adjusting the work gear prior to clamping it in place on the work spindle comprises a bracket 71 pivoted at 71a to adjust the mechanism to vary the rotational adjustment of the gear W on spindle 25. Bracket 71 carries a housing 71b. Within the housing is a pin 72 provided with a flat projection 73 for interdental engagement with the work gear. A shoulder 74 is provided on pin 72, against which bears spring 75, biasing the pin in a direction to clear the work gear. Set screw 76 is adapted to lock pin 72 in forward position. By proper initial adjustment of locating pin 72, subsequent loading of the gear entails only slipping the gear in place, engaging projection 72 in a tooth space, and operating the pressure cylinder 33 to lock the gear in place.

The spindle generally indicated at 25 is slidably and rotatably mounted in housing 11 and is also provided with a central bore 27 in which is slidably mounted shaft 41. A short sleeve 50, also centrally bored, is secured to one end of spindle 25 and receives a portion of shaft 41 and a shaft 53, secured to shaft 41. Sleeve 50 is reduced in diameter as at 51 to receive a work piece W, and to provide a shoulder 52. Short shaft 53 is provided with an annular projection 54. A C-washer 55 is provided, and as will be evident, when shafts 41 and 53 are moved to the right (Figure 1) the work W is securely locked in position thereby.

The opposite end of spindle 25 is reduced to receive index gear 34 and locking sleeve 35 is threaded onto spindle 25 beyond the reduced portion to clampingly engage gear 34. Locking sleeve 35 also threadedly engages air cylinder 33, and rigidly secures the cylinder and spindle 25 together.

Secured to the frame 10 on a projection 38 is an index rack bracket 36. This bracket is adjustable in vertical ways 37 in the projection, and at its upper end (see Figures 4-6) has an offset portion 86 which carries teeth 39 and 40. A slot 85 is provided in the shank of the bracket to permit vertical adjustment and clamping in adjusted position.

Rack teeth 39, as shown, are three in number. Teeth 40, two in number, are staggered with relation to teeth 39, so that a tooth 40 is opposite each tooth space between teeth 39. Teeth 39 are beveled on their inboard edge as at 90, and teeth 40 are beveled on the edge confronting teeth 39 as at 91. Teeth 40 are spaced from teeth 39 by a distance just slightly less than the axial width of index gear 34.

Index gear 34, as seen in Figures 7 and 8, comprises an ordinary gear having teeth 80 conjugate to rack teeth 39 and 40. This results in the gear, and hence the work spindle being accurately held against rotation when teeth 80 are in full mesh with teeth 40, which is the condition that exists during the cutting operation. Teeth 80 are also beveled as at 82, these bevels cooperating with bevels 90 and 91 on rack teeth 39 and 40.

As seen in Figure 1, index gear 34 is mounted to reciprocate axially between rack teeth 39 and 40. Due to the bevels described, and the staggered relation of the rack teeth, each complete reciprocation of the index gear advances the index gear one tooth space. Additionally, due to the firm meshing engagement between the teeth, spindle 25 is accurately held against rotation as it is moved so that work W engages the tools.

As best seen in Figure 3, air cylinder 33 includes a piston rod 43 which is threaded to shaft 41 as at 42. Air passages 46 and 47 lead to opposite sides of the piston and connect to nipples 45, only one of which appears in Figure 3. Cylinder 33 is rotatably secured to sleeve 48 as by bearings 48a. This permits rotation of the cylinder in unison with rotation of shaft 25, without rotating sleeve 48 carrying the nipples 45 which are connected to a controlled supply of fluid pressure.

Cylinder 33 is supported for rotation and reciprocation on a laterally extending arm 30, a bushing 32 being provided in enlarged apertured head 31 for this purpose.

The operation of my improved machine is obvious from the foregoing. Suitable tools, selected according to the nature of the work are rotated independently. Motor 15 reciprocates spindle 25, feeding the work into the tools to a definite predetermined but adjustable depth. Reciprocation of the spindle automatically indexes the work. After a work piece is completed, air cylinder 33 operates to push shafts 43, 41, 53 to the left, releasing lock washer 55, which may be removed radially, and a new work piece substituted for the one completed.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. A gear chamfering machine comprising a gear supporting spindle, a pair of cutter supporting spindles mounted at opposite sides of the axis of said first spindle, means for locking a gear on said first spindle, means for reciprocating said first spindle, and means effective on reciprocation of said spindle for indexing said spindle by the amount of the tooth spacing on said gear, said indexing means comprising a pair of spaced, fixed rack sections, and a gear carried by said first spindle and reciprocable between said rack sections, said rack sections and said last mentioned gear having cooperating inclined teeth portions for effecting indexing rotation of said first spindle.

2. In a gear chamfering machine having an indexable gear-supporting spindle and indexing means for indexing said spindle step by step: means for locking a gear on said spindle in definite relation to said indexing means comprising a bracket secured adjacent said spindle, a plunger slidable in said bracket toward and away from said spindle, said plunger having a tooth-engaging portion adapted to locate said gear on said spindle in definite relation as to rotation, clamping means for locking said gear to said spindle while retained in said definite relation as to rotation thereon and resilient means biasing said plunger away from said spindle toward a position in which said tooth-engaging portion clears said gear.

3. In a gear chamfering machine having an indexable gear-supporting spindle and indexing means for indexing said spindle step by step: means for locking a gear on said spindle in definite relation to said indexing means comprising a bracket secured adjacent said spindle, a plunger slidable in said bracket toward and away from said spindle, said plunger having a tooth-engaging portion adapted to locate said gear on said spindle in definite relation as to rotation, clamping means for locking said gear to said spindle while retained in said definite relation as to rotation thereon, resilient means biasing said plunger away from said spindle toward a position in which said tooth-engaging portion clears said gear and locking means engageable with said plunger to retain the same in forward or gear-engaging position when desired.

4. In a gear chamfering machine having an indexable gear-supporting spindle and indexing means for indexing said spindle step by step: means for locking a gear on said spindle in definite relation to said indexing means comprising a bracket secured adjacent said spindle, a plunger slidable in said bracket toward and away from said spindle, said plunger having a tooth-engaging portion adapted to locate said gear on said spindle in definite relation as to rotation, and clamping means for locking said gear to said spindle while retained in said definite relation as to rotation thereon, said bracket being initially adjustable about an axis parallel to the axis of said gear-supporting spindle to vary the relationship between said gear and said spindle.

ROBERT S. DRUMMOND.